United States Patent
Li et al.

(10) Patent No.: US 9,853,266 B2
(45) Date of Patent: Dec. 26, 2017

(54) VENT AND CAP ASSEMBLY OF POWER BATTERY

(71) Applicant: Ningde Amperex Technology Limited, Ningde (CN)

(72) Inventors: Quankun Li, Ningde (CN); Pinghua Deng, Ningde (CN); Peng Wang, Ningde (CN); Jibin Geng, Ningde (CN); Kai Wu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 620 days.

(21) Appl. No.: 14/253,805

(22) Filed: Apr. 15, 2014

(65) Prior Publication Data

US 2014/0315050 A1   Oct. 23, 2014

(30) Foreign Application Priority Data

Apr. 19, 2013   (CN) ...................... 2013 2 0201888 U

(51) Int. Cl.
*H01M 2/12*   (2006.01)
*H01M 2/36*   (2006.01)

(52) U.S. Cl.
CPC ........... *H01M 2/1235* (2013.01); *H01M 2/36* (2013.01); *H01M 2/1241* (2013.01)

(58) Field of Classification Search
CPC ..... H01M 2/1235; H01M 2/1241; H01M 2/36
USPC ........................................................... 429/56
See application file for complete search history.

(56) References Cited

U.S. PATENT DOCUMENTS

| | | | | |
|---|---|---|---|---|
| 2010/0216014 A1* | 8/2010 | Wendling | ............ | H01M 2/0413 429/174 |
| 2010/0330416 A1* | 12/2010 | Wang | ...................... | H01M 2/08 429/185 |
| 2011/0081572 A1* | 4/2011 | Byun | ...................... | H01M 2/26 429/178 |
| 2012/0015219 A1* | 1/2012 | Wang | .................. | H01M 2/1241 429/53 |

* cited by examiner

*Primary Examiner* — Jonathan Jelsma
*Assistant Examiner* — Rashid Alam
(74) *Attorney, Agent, or Firm* — Morgan, Lewis & Bockius LLP

(57) ABSTRACT

The present disclosure provides a vent and a cap assembly of a power battery. The vent comprises a vent body and a vent body protective sheath having a wall portion and a hollow portion, the vent body is fixedly connected to a lower portion of the wall portion and sealing the hollow portion from below, an upper portion of the wall portion is fixedly connected to a cap plate for sealing a vent hole. The cap assembly of the power battery comprises a cap plate provided with a vent hole and an electrolyte-injection hole; a first electrode post connected to the cap plate; a second electrode post connected to the cap plate; and a vent fixedly provided to the vent hole; wherein the vent is the above vent.

14 Claims, 5 Drawing Sheets

VENT AND CAP ASSEMBLY OF POWER BATTERY

REFERENCE TO RELATED APPLICATIONS

The present application claims priority to Chinese Patent Application No. CN 201320201888.6 filed on Apr. 19, 2013, the content of which is fully incorporated in its entirety herein.

FIELD OF THE PRESENT DISCLOSURE

The present disclosure relates to power battery field, particularly relates to a vent and a cap assembly of a power battery.

BACKGROUND OF THE PRESENT DISCLOSURE

With development of modern society and people's awareness of environmental protection, more and more equipment use a rechargeable secondary battery as a power source, such as mobile phones, laptops, electrical tools, electrical automobiles and energy storage power stations, which provides a broad space for application and development of the rechargeable secondary battery. Accordingly, safety of power batteries is attracted more and more attention, especially the safety of the power batteries with high capacity which are required by such as electrical automobiles and energy storage power stations.

To ensure the safety of a power battery to a certain extent, generally a cap assembly of a power battery is provided with a vent. When the battery has an accident caused by improper charging, short circuit, or exposure to a poor environment such as a high temperature environment, the battery with high energy will produce a large amount of gas and temperature thereof will rise sharply, the gas bursts through the vent to release pressure, existence of the vent greatly improves safety performance of the battery. But a certain amount of gas will be produced in normal operation or manufacturing process of the battery, and generally a gas pressure of equal to or less than 0.2 MPa will generated. If the vent bursts prematurely under less than 0.2 MPa, there must be too many limitations on production processes and operative conditions of the battery, and what is even worse is that the battery can not be normally produced or can not normally operate. If bursting pressure of the vent is too large, and the vent exhausts and releases pressure too late, battery explosion will be caused.

Some batteries are provided with the vents in cap assemblies in the prior art, which are generally formed by stamping, difference between an upper limit and a lower limit of the bursting pressure of the vent itself is equal to or less than 0.3 MPa based on processing capability of the industry in the prior art. But after the cap assembly is assembled with a case to form the battery, the gas pressure inside the battery increases due to produced gas in the production or operative process of the battery, so as to cause case expansion to produce a force which applies on the cap assembly of the battery, the force is then transmitted to the vent. Namely the vent also bears a drawing force produced by case deformation in a direction parallel to the cap assembly of the battery in addition to an effect by gas pressure in a direction perpendicular to the vent body, if the drawing force is too large, the strength at the vent will be greatly reduced, so as to greatly reduce the bursting pressure of the vent. As the battery is required to have an increased capacity density as much as possible in the prior art, thicknesses of walls of the case and the cap assembly of the battery are more and more thinner, which causes the strength to get worse, so as to increase the probability of occurrence of the above situation that the bursting pressure of the vent is reduced. If an original design requirement on the bursting pressure of the vent is 0.4~0.7 MPa, because of the above drawing force, the bursting pressure of the vent will be integrally reduced by 0.2~0.4 MPa, which very likely causes the vent to burst in the production or normal operative process. At the same time, the upper limit of the bursting pressure of the vent is not expected to be increased, because it will greatly increase risk that the vent cannot timely burst and release pressure in an abusing environment, so as to cause firing and explosion of the battery.

SUMMARY OF THE PRESENT DISCLOSURE

In view of the problem in the background of the present disclosure, an object of the present disclosure is to provide a vent and a cap assembly of a power battery, which can allow a bursting pressure of a vent body to stabilize in a certain pressure range, so as to prevent the battery from bursting prematurely in manufacturing or operative process, at the same time to ensure the battery to burst and release pressure timely when the interior of the battery gets out of control, thereby avoiding firing and explosion, and further improving safety performance of the battery.

In order to achieve the above object, in a first aspect, the present disclosure provides a vent, which comprises: a vent body; and a vent body protective sheath having a wall portion and a hollow portion, the vent body is fixedly connected to a lower portion of the wall portion and sealing the hollow portion from below, an upper portion of the wall portion is fixedly connected to a cap plate for sealing a vent hole.

In order to achieve the above object, in a second aspect, the present disclosure provides a cap assembly of a power battery, which comprises: a cap plate provided with a vent hole and an electrolyte-injection hole; a first electrode post connected to the cap plate; a second electrode post connected to the cap plate; and a vent fixedly provided to the vent hole; wherein the vent is the vent according to the first aspect of the present disclosure.

The present disclosure has the following beneficial effects:

The vent body protective sheath provided in the vent according to the present disclosure can allow a bursting pressure of the vent body to stabilize in a certain pressure range, so as to prevent the vent body from bursting prematurely in manufacturing or operative process, at the same time to ensure the vent body to burst to release pressure timely when the interior of the battery gets out of control, thereby preventing firing and explosion, and further improving safety performance of the battery.

Figure 1:
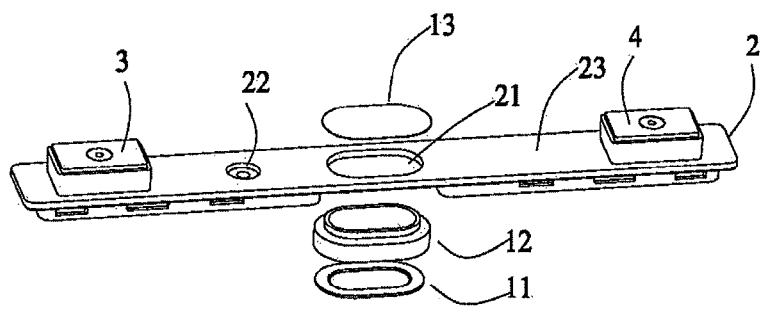
FIG. 1 is an exploded perspective view of a cap assembly of a power battery according to the present disclosure.
Figure 2:
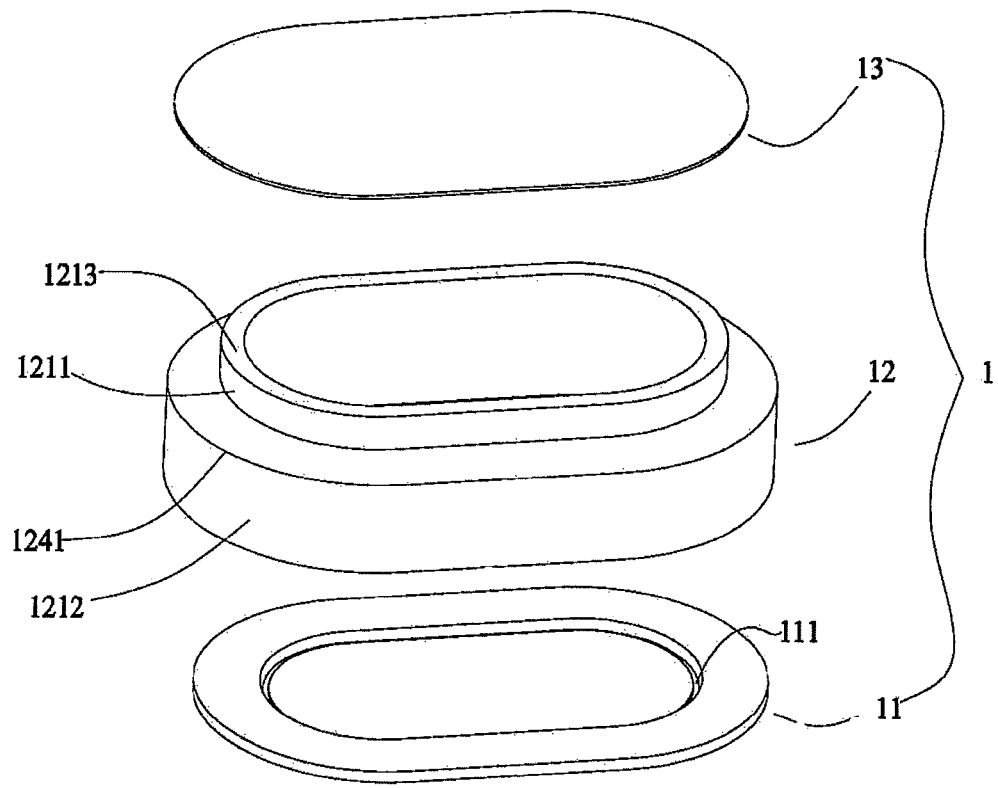
FIG. 2 is an enlarged view of a vent in FIG. 1.

Reference numerals of the embodiments are represented as follows:

1 vent
  11 vent body
    111 notch
      1111 outer side edge
      1112 inner side edge
  12 vent body protective sheath
    121 wall portion
      1211 upper portion
      1212 lower portion
      1213 upper end surface
      1214 lower end surface
    122 hollow portion
    123 recessed portion
    124 stepped portion
      1241 edge
  13 vent protective sheet
2 cap plate
  21 vent hole
  22 electrolyte-injection hole
  23 upper surface
  24 lower surface
3 first electrode post
4 second electrode post

DETAILED DESCRIPTION

Hereinafter a vent and a cap assembly of a power battery according to the present disclosure will be described in combination with the drawings.

Firstly a vent according to a first aspect of the present disclosure will be described.

As shown in FIG. 1 to FIG. 10, a vent 1 according to a first aspect of the present disclosure comprises: a vent body 11; a vent body protective sheath 12 having a wall portion 121 and a hollow portion 122, the vent body 11 is fixedly connected to a lower portion 1212 of the wall portion 121 and sealing the hollow portion 122 from below, an upper portion 1211 of the wall portion 121 is fixedly connected to a cap plate 2 for sealing a vent hole 21.

The application of the vent body protective sheath 12 can greatly improve strength of the cap assembly at the vent 1, and minimize as much as possible or even eliminate bursting pressure drop of the vent body 11 caused by a drawing force borne in a direction parallel to the cap plate 2, ensure the vent 1 to stabilize in a certain pressure range to burst; at the same time can allow the vent 1 to burst and release pressure timely when the interior of the battery gets out of control, so as to prevent firing and explosion of the battery, improve safety performance of the battery, and further seal the vent hole 21.

In practical applications, the vent body 11 is fixedly connected to the lower portion 1212 of the wall portion 121, which may be realized by welding. The upper portion 1211 of the wall portion 121 is fixedly connected to the cap plate 2 for sealing the vent hole 21, which may also be realized by welding. Preferably, an upper end surface 1213 of the wall portion 121 is flush with an upper surface 23 of the cap plate 2, the upper end surface 1213 is in butt welding with the upper surface 23, so as to allow the upper portion 1211 of the wall portion 121 to be fixedly connected to the cap plate 2 for sealing the vent hole 21. Of course, the upper end surface 1213 may also be designed that the upper end surface 1213 is slightly lower than the upper surface 23 of the cap plate 2 according to requirements.

In addition, as shown in FIG. 1 to FIG. 10, the vent 1 may further comprise: a vent protective sheet 13 fixedly connected onto the cap plate 2 and covering the vent hole 21 from above. At this time, the vent protective sheet 13 covers the hollow portion 122 of the vent body protective sheath 12 from above and seals the vent hole 21 of the cap plate 2, so as to prevent damage of the vent 1 caused by external force in battery manufacturing and operative processes and prevent debris from falling into the hollow portion 122 of the vent body protective sheath 12. In addition, the vent protective sheet 13 may adopt any applicable vent protective sheet (such as a shape shown in the drawings, may also be a mesh shape). That the vent protective sheet 13 is fixedly connected onto the cap plate 2 and covers the vent hole 21 from above may be realized by hot-stamping or adhesive bonding. Preferably, the vent protective sheet 13 may also be fixedly connected to the upper end surface 1213 of the wall portion 121 by hot-stamping or adhesive bonding, to increase adhesion force with the cap plate 2, to better prevent ambient influence on the vent 1.

For an outer shape of the wall portion 121, as shown in FIG. 1 to FIG. 10, preferably, the wall portion 121 of the vent body protective sheath 12 is provided with a stepped portion 124 at an outer side surface. Preferably, the stepped portion 124 closely abuts against the lower surface 24 of the cap plate 2 at an edge 1241, which may function as limiting. In addition, the stepped portion 124 may also allow a vent body 11 with a larger area, so as to improve the safety performance of the battery. In addition, the edge 1241 of the stepped portion 124 may also be used for welded connection with the cap plate 2 at the corresponding lower surface 24 at the vent hole 21. Of course, the shape of the wall portion 121 of the vent body protective sheath 12 at the outer side surface is not limited to that, skilled in the art may use any suitable shape.

Figure 3:
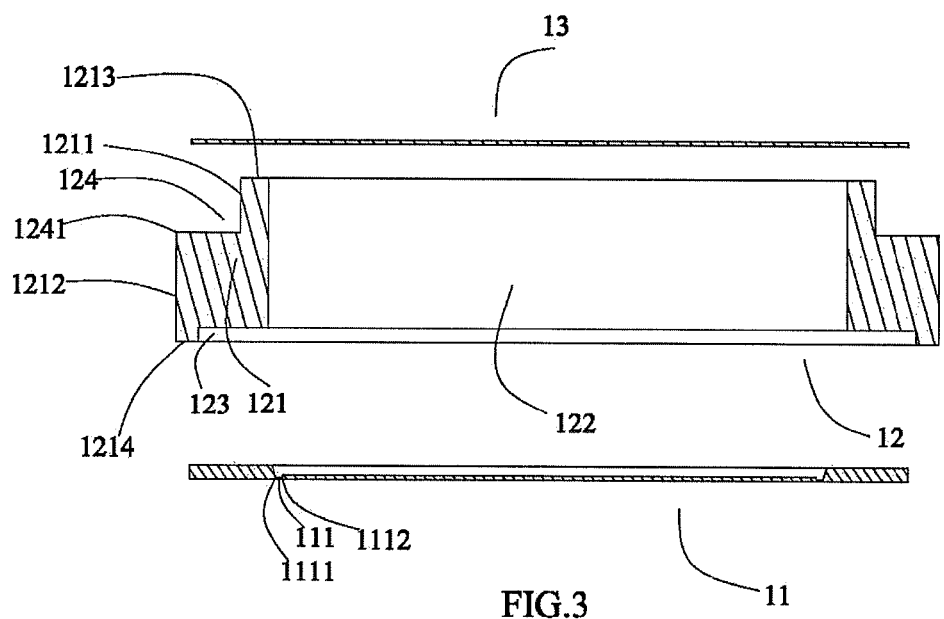
FIG. 3 is a cross-sectional view of the vent in FIG. 2.

In the vent 1 according to the first aspect of the present disclosure, for improving sealing reliability between the vent body 11 and the vent body protective sheath 12, preferably, as shown in FIG. 3, the wall portion 121 of the vent body protective sheath 12 is provided with a recessed portion 123 at a lower end surface 1214, the vent body 11 is fixedly connected in the recessed portion 123. In practical applications, the vent body 11 is fixedly connected in the recessed portion 123, which may be realized by welding preferably butt welding.

In the vent 1 according to the first aspect of the present disclosure, as shown in FIG. 1 to FIG. 10, shapes of the wall portion 121 and the vent protective sheet 13 may be a circle or an ellipse in top view. However, the present disclosure is not just limited to this, may also be such as a rectangle; in practical applications, the shapes of the wall portion 121 and the vent protective sheet 13 may be determined according to the shape of the vent hole 21, for example, if the shape of the vent hole 21 is a circle in top view, the shapes of the wall portion 121 and the vent protective sheet 13 may be a circle in top view.

In the vent 1 according to the first aspect of the present disclosure, as shown in FIG. 1 to FIG. 10, a shape of the vent body 11 may be a circle or an ellipse in top view. However, the present disclosure is not just limited to this, may also be such as a rectangle; in practical applications, the shape of the vent body 11 can be determined according to the shape of the wall portion 121 of the vent body protective sheath 12 in top view, for example, if the shape of the wall portion 121 is a circle in top view, the shape of the vent body 11 may be a circle in top view.

In the vent 1 according to the first aspect of the present disclosure, the vent body 11 is a foil with a uniform thickness, as shown in FIG. 6 to FIG. 10, a thickness is preferably 0.03~0.15 mm.

In the vent 1 for the cap assembly of the power battery according to the first aspect of the present disclosure, the vent body 11 is provided with a notch 111 at an edge portion thereof, as shown in FIG. 2 to FIG. 5. A thickness of the vent body 11 between an outer side edge 1111 and an inner side edge 1112 of the notch 111 is preferably 0.03~0.06 mm; a thickness of the vent body 11 inside the inner side edge 1112 of the notch 111 is preferably 0.1~0.2 mm; a thickness of the vent body 11 outside the outer side edge 1111 of the notch 111 is preferably 0.3~0.5 mm. At this moment the vent body 11 is a foil which is thin in middle and thick in periphery. Preferably, an area enclosed by an inner side edges 1112 of the notch 111 is smaller than or equal to an area of the hollow portion 122. Of course, the area enclosed by the inner side edge 1112 may be designed to be slightly larger than the area of the hollow portion 122 according to requirements.

In the vent 1 according to the first aspect of the present disclosure, the vent body 11 is preferably metal, and further preferably at least one of aluminum and nickel.

It should be noted that, in practical applications, an area of the vent body 11 is preferably not larger than an area of a lower end surface 1214 of the wall portion 121 of the vent body protective sheath 12 (the area of the lower end surface 1214 refers to an area enclosed by an outermost edge of the lower end surface 1214), as shown in FIG. 2 to FIG. 5, and FIG. 8 to FIG. 10.

In the vent 1 according to the first aspect of the present disclosure, a material of the vent body protective sheath 12 is preferably metal, and further preferably at least one of aluminum and nickel.

In the vent 1 according to the first aspect of the present disclosure, a material of the vent protective sheet 13 is preferably an electrolytic corrosion-resistant material, and further preferably at least one of polypropylene, polyethylene terephthalate and polyethylene.

Hereinafter a cap assembly of a power battery according to a second aspect of the present disclosure will be described.

Figure 4:
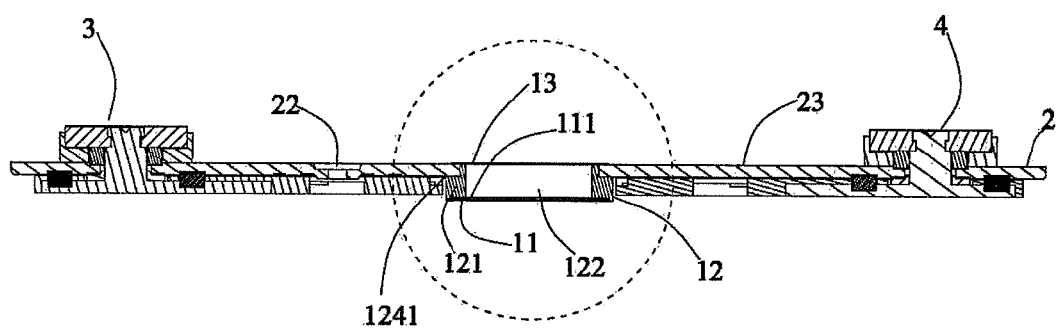
FIG. 4 is a cross-sectional view of the cap assembly of the power battery in FIG. 1 after assembling.
Figure 5:
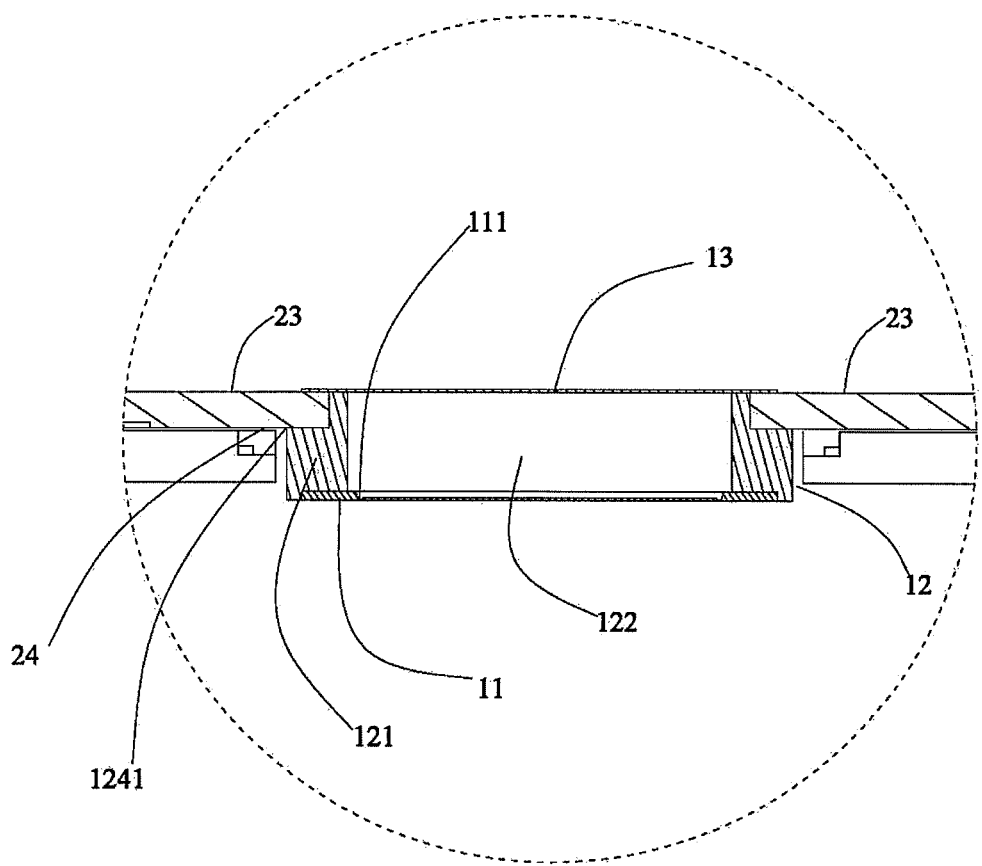
FIG. 5 is an enlarged view indicated by a circle of FIG. 4.
Figure 6:
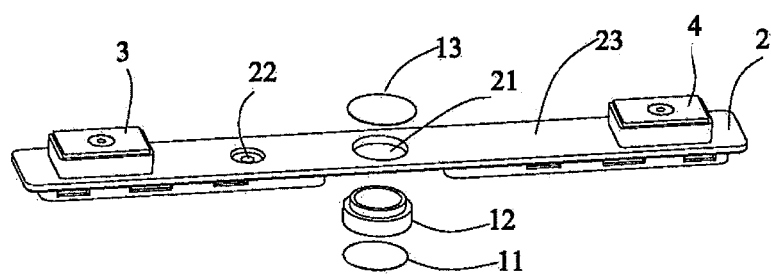
FIG. 6 is an exploded perspective view of a varied structure of the cap assembly of the power battery in FIG. 1.
Figure 7:
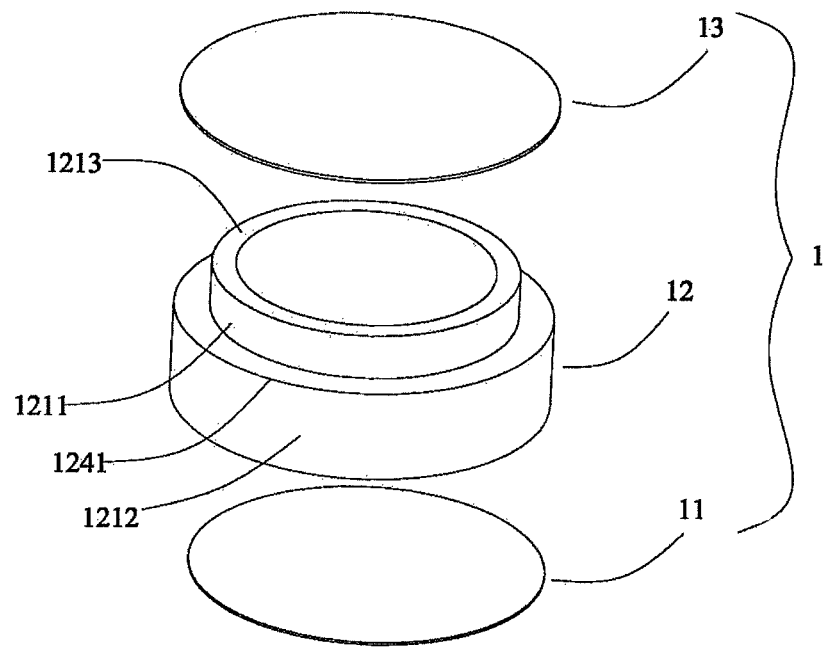
FIG. 7 is an enlarged view of the vent in FIG. 6.
Figure 8:
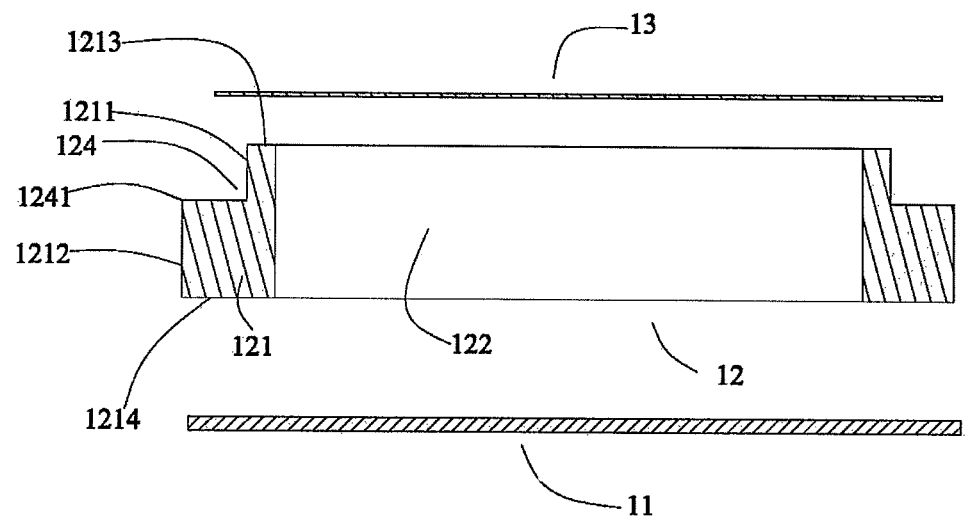
FIG. 8 is a cross-sectional view of the vent in FIG. 7.
Figure 9:
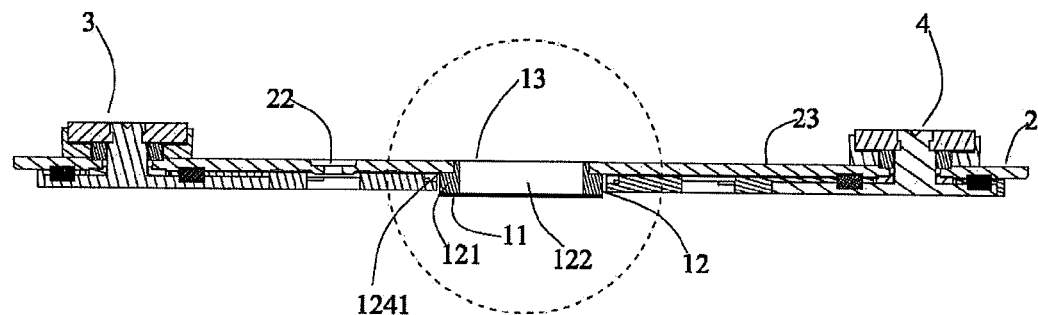
FIG. 9 is a cross-sectional view of the cap assembly of the power battery in FIG. 6 after assembling.
Figure 10:
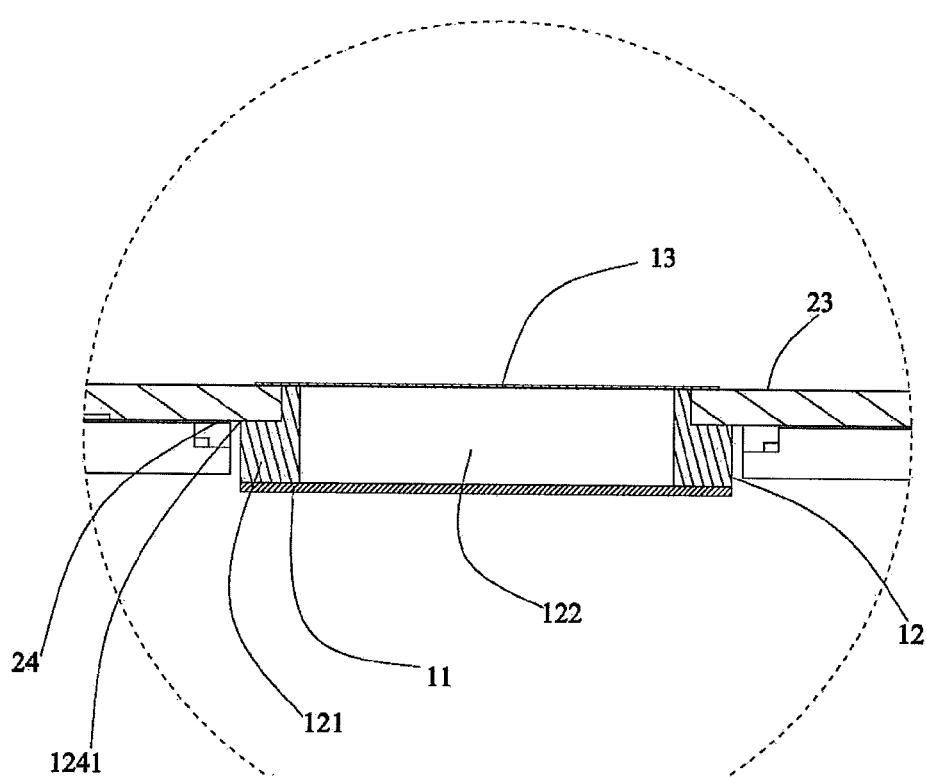
FIG. 10 is an enlarged view indicated by a circle of FIG. 9.

As shown in FIG. 1 and FIG. 4, a cap assembly of a power battery according to the second aspect of the present disclosure comprises: a cap plate 2 provided with a vent hole 21 and an electrolyte-injection hole 22; a first electrode post 3 connected to the cap plate 2; a second electrode post 4 connected to the cap plate 2; and a vent 1 fixedly provided to the vent hole 21; wherein the vent 1 is the vent 1 according to the first aspect of the present disclosure.

In the cap assembly of the power battery according to the second aspect of the present disclosure, the cap plate 2, the first electrode post 3, the second electrode post 4 and the vent 1 are integrally assembled.

In the cap assembly of the power battery according to the second aspect of the present disclosure, the upper portion 1211 of the wall portion 121 of the vent body protective sheath 12 is fixedly connected to the cap plate 2 for sealing the vent hole 21, which may be realized by welding.

In the cap assembly of the power battery according to the second aspect of the present disclosure, a shape of the vent hole 21 may be a circle or an ellipse in top view.

What is claimed is:

1. A cap assembly of a power battery configured to release pressure from the power battery, comprising: a cap plate provided with a vent hole and a vent configured to release pressure on the cap plate of the power battery, the vent comprising a vent body, and a vent body protective sheath, both located inside the power battery and below the cap plate, wherein:
   the vent body protective sheath has a wall portion and a hollow portion, the vent body being fixedly connected to a lower portion of the wall portion and sealing the hollow portion from below, an upper portion of the wall portion being fixedly connected to an interior surface of the cap plate facing an inside of the power battery, and the upper portion of the wall portion having an upper end that is co-planar with an exterior surface of the cap plate of the power battery for sealing the vent hole in the cap plate;
   wherein the wall portion of the vent body protective sheath is provided with a stepped portion at an outer side surface between the lower portion and the upper portion of the wall portion and the stepped portion is directly connected to the interior surface of the cap plate at an edge from below.

2. The cap assembly of a power battery according to claim 1, wherein the wall portion of the vent body protective sheath is provided with a recessed portion at a lower end surface, the vent body is fixedly connected in the recessed portion.

3. The cap assembly of a power battery according to claim 1, wherein the vent body is a foil with a uniform thickness.

4. The cap assembly of a power battery according to claim 1, wherein the vent body is provided with a notch at an edge portion thereof.

5. The cap assembly of a power battery according to claim 4, wherein an area enclosed by an inner side edges of the notch is smaller than or equal to an area of the hollow portion.

6. The cap assembly of a power battery according to claim 1, wherein an area of the vent body is not larger than an area of the lower end surface of the wall portion of the vent body protective sheath.

7. The cap assembly of a power battery according to claim 1, further comprising:
   a vent protective sheet fixedly connected onto the cap plate and covering the vent hole from above.

8. A cap assembly of a power battery configured to release pressure from the power battery, comprising:
   a cap plate provided with a vent hole and an electrolyte-injection hole;
   a first electrode post connected to the cap plate;
   a second electrode post connected to the cap plate; and
   a vent fixedly connected to the vent hole, the vent comprising a vent body and a vent body protective sheath, both located inside the power battery and below the cap plate, the vent body protective sheath having a wall portion and a hollow portion, the vent body being fixedly connected to a lower portion of the wall portion and sealing the hollow portion from below, an upper portion of the wall portion being fixedly connected to an interior surface of the cap plate facing an inside of the power battery, and the upper portion of the wall portion having an upper end that is co-planar with an exterior surface of the cap plate of the power battery for sealing the vent hole in the cap plate;

wherein the wall portion of the vent body protective sheath is provided with a stepped portion at an outer side surface between the lower portion and the upper portion of the wall portion and the stepped portion is directly connected to the interior surface of the cap plate at an edge from below.

9. The cap assembly of the power battery according to claim 8, wherein the wall portion of the vent body protective sheath is provided with a recessed portion at a lower end surface, the vent body is fixedly connected in the recessed portion.

10. The cap assembly of the power battery according to claim 8, wherein the vent body is a foil with a uniform thickness.

11. The cap assembly of the power battery according to claim 8, wherein the vent body is provided with a notch at an edge portion thereof.

12. The cap assembly of the power battery according to claim 11, wherein an area enclosed by an inner side edges of the notch is smaller than or equal to an area of the hollow portion.

13. The cap assembly of the power battery according to claim 8, wherein an area of the vent body is not larger than an area of the lower end surface of the wall portion of the vent body protective sheath.

14. The cap assembly of the power battery according to claim 8, the vent further comprises:

a vent protective sheet fixedly connected onto the cap plate and covering the vent hole from above.

* * * * *